United States Patent [19]

Legatti

[11] Patent Number: 4,931,894
[45] Date of Patent: Jun. 5, 1990

[54] GROUND FAULT CURRENT INTERRUPTER CIRCUIT WITH ARCING PROTECTION

[75] Inventor: Raymond Legatti, Clearwater, Fla.

[73] Assignee: Technology Research Corporation, Clearwater, Fla.

[21] Appl. No.: 414,841

[22] Filed: Sep. 29, 1989

[51] Int. Cl.$^5$ .............................................. H02H 3/26
[52] U.S. Cl. ....................................... 361/45; 361/46; 361/2
[58] Field of Search .................... 361/2, 42, 45, 46, 49, 361/50

[56] References Cited

U.S. PATENT DOCUMENTS

| | | | |
|---|---|---|---|
| 4,015,169 | 3/1977 | Misencik | 361/45 |
| 4,194,231 | 3/1980 | Klein | 361/45 |
| 4,285,022 | 8/1981 | Lewiner et al. | 361/45 |
| 4,378,579 | 3/1983 | Hudson, Jr. | 361/42 X |
| 4,598,331 | 7/1986 | Legatti | 361/46 |

Primary Examiner—Derek S. Jennings
Attorney, Agent, or Firm—Wood, Phillips, Mason, Recktenwald & Van Santen

[57] ABSTRACT

A ground fault current interrupter (GFCI) circuit is provided with the additional capacity of detecting and protecting against arcing between a power line and the metal sheath or cover of a power cable. An arc protection winding is located on the core of the GFCI differential transformer and is connected in series with a resistance between the metal sheath and a neutral or return line. By adjusting the number of turns of the arc protection winding and the size of the series resistance, the sensitivity of the arc portection arrangement to arcing current may be set at a desired level.

5 Claims, 1 Drawing Sheet

GROUND FAULT CURRENT INTERRUPTER CIRCUIT WITH ARCING PROTECTION

BACKGROUND OF THE INVENTION

1. Field of the Invention

This invention relates generally to ground current interrupter circuits, and more specifically, this invention relates to a ground fault current interrupter that is actuated to break the power line when undesired arcing occurs between the power line and a metal sheath or cover for the power cable, as well as in the presence of a ground fault current.

2. Description of the Prior Art

Ground fault current interrupter (GFCI) circuits are used to protect against an undesired grounding of a power line, such as by a person inadvertently being connected from the power line to ground at an outlet in the home. A common form of such a ground fault current interrupter circuit includes a differential transformer with opposed primary windings, one primary winding being associated with the power line and the other being associated with the neutral return line. If a ground fault should occur on the load side of the GFCI circuit, the two primary windings will not cancel, with the result that a flux flow is produced in the core of the differential transformer. This resultant flux flow is detected by a secondary winding on the differential transformer core, and this secondary winding then produces a trip signal for a circuit opening arrangement to open the power line.

While such GFCI circuits have protected many people from serious injury or death in the event of a ground fault current, there are other types of hazardous situations that are not protected against by the basic GFCI circuit. Thus, for example, in U.S. Pat. No. 4,598,331, arrangements are shown for protecting against potentially hazardous situations such as an open neutral or ground lead, an excessive voltage between the neutral lead and the ground lead, and reversal of input connections between the power and neutral lines. However, there are concerns with respect to electrical power cords and equipment other than these situations that are potentially hazardous to a person using the equipment.

One such concern relates to the arcing between a power line and a metallic sheath or cover that may occur in electrical power cords or cables. Such electrical arcing may not be a direct threat to an individual person, but it can result in combustion. The resulting fire is potentially hazardous to both health and property.

Accordingly, it would be desirable to have a GFCI circuit that is capable of protecting against undesired arcing, as well as against the ground fault currents that are the basic protective function of the GFCI circuits.

SUMMARY OF THE INVENTION

The present invention relates to a GFCI circuit that provides conventional protection against ground fault currents. In addition, the GFCI circuit of this invention will also detect, and protect against the dangerous consequences of, undesired arcing between a power line and an electrical power cable sheath or cover.

To achieve the additional protection against undesired arcing, this invention utilizes a lead from the metal sheath or casing to the neutral or return line. In this lead there is included an arc protection winding located on the core of a differential transformer, the arc protection winding being connected in series with a suitable resistance. If arcing should occur, the current flow through the arc protection winding would create an imbalance in the differential transformer, which in turn would produce a trip signal in the secondary winding of the differential transformer. The trip signal in the secondary winding would initiate actuation of a circuit opening device to break the power line and prevent the possibility of fire.

The number of turns of the arc protection winding may be varied to adjust the sensitivity of the arc protection arrangement to arcing current. Thus, the magnitude of the arcing current at which the circuit opening device will be actuated may be adjusted in accordance with a desired protection plan. The resistance in series with the arc protection winding would also be adjusted in connection therewith to establish the magnitude of arcing current at which tripping is desired.

These and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 1:
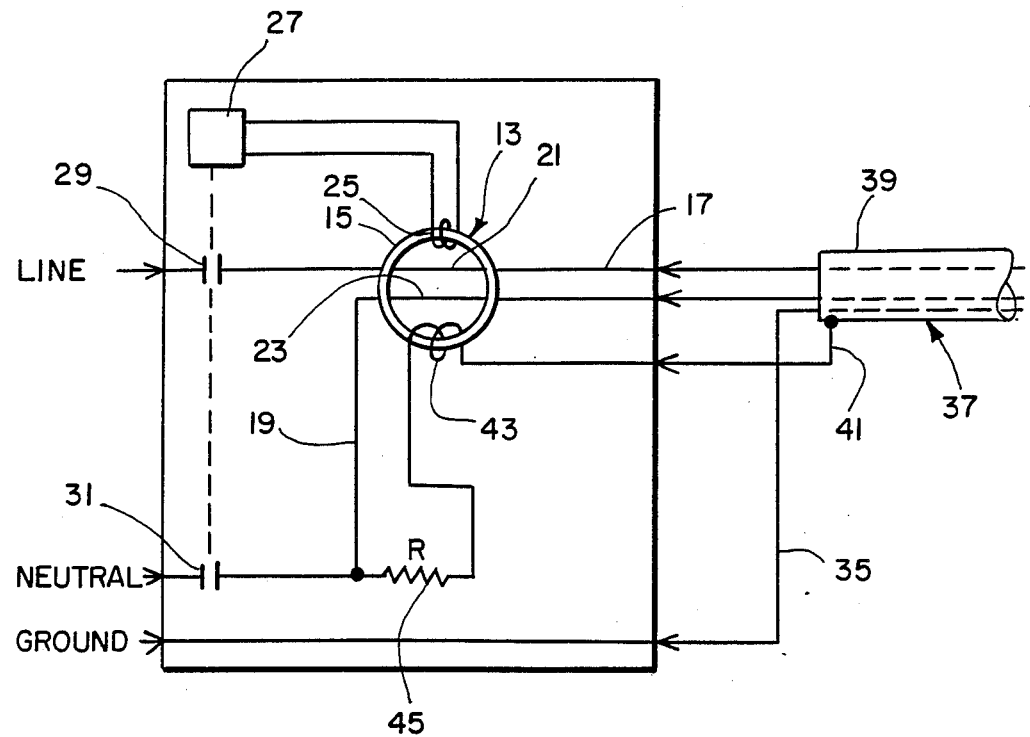
FIG. 1 schematic circuit diagram of a preferred the present invention.

With respect to the ground fault current interrupter (GFCI) circuit shown in diagram form in FIG. 1, the portion that would be physically sold as a GFCI is illustrated at 11. GFCI 11 has a differential transformer 13, which includes a differential transformer core I. Passing through the transformer core 15 are a power line 17 and a neutral or return line 19. The portion 21 of power line 17 and the portion 23 of neutral line 19 schematically represent primary windings on the core 15. The primary windings 21 and 23 are oppositely wound. Thus, in normal operation the current returning through neutral line 19 would be equal to the current flow through the power line 17, and the flux generated by primary winding 21 would be offset or cancelled by the flux generated by the primary winding 23.

In the event of a ground fault current at the load, however, the current returning through neutral line 19 would not be equal to the current in power line 17, and hence the flux generated by the primary winding 23 would not completely counter the flux generated by the primary winding 21. The resultant flux flow would be detected by a secondary winding 25, which is wound on the core 15 and connected to a circuit opening device 27. One example of such a circuit opening device circuit may be seen in U.S. Pat. No. 4,598,331 Legatti, assigned to the same assignee as the present invention. Upon actuation, the circuit opening device would open the circuit closure 29 in power line 17. In this particular example, the circuit opening device is also arranged to open a circuit closure 31 in the neutral line 19.

Although not essential, the system and the GFCI may include a ground line in addition to the neutral line, shown here as line 35.

Power for the load is conveyed from the GFCI by a power cable or load cord 37. Power cable 37 is provided with a metal sheath 39 surrounding the power and neutral lines (and/or the ground line/or sensing lead, if utilized).

In order to detect, and protect against the deleterious effects of, arcing, a lead 41 is connected to metal sheath 39. (Although the invention is described in connection with arcing to the metal sheath of a power cable, it should be recognized that the term "sheath" is used in the broad sense of any metallic cover sensing lead or casing.)

Lead 41 is connected from the metal sheath 39 to an arc protection winding 43, which is located on the differential transformer core 15. Arc protection winding 43 is connected in series with a resistance 45. Lead 41, together with the arc protection winding 43 and resistance 45, is connected between metal sheath 39 and the neutral line 19.

If arcing should occur between power line 17 and metal sheath 39, the current flow through lead 41, winding 43 and resistance 45 would create an imbalance in the differential transformer 13. The resultant flux flow would be detected by the secondary winding 25 to actuate the circuit opening device 27 and break the power line 17 (and also break the neutral line 19, if so desired).

The magnitude of the arcing current between power line 17 and metal sheath 39 that would produce a signal in secondary winding 25 to trip the circuit opening device 27 would depend upon the number of turns in winding 43 and the size of the resistance 45. Thus, as an illustrative example, a single turn arc protection winding 43 could be utilized with a 24 Kohm resistance to provide a device responsive to an arcing current of approximately 5 milliamperes. Now, if the winding 43 were provided with two turns, and a resistance of 48 Kohm were utilized, secondary winding 25 would produce a trip signal in response to an arcing current of approximately 2.5 milliamperes. Thus, the sensitivity of the arc protection portion of this GFCI circuit may be adjusted within certain limits.

It should be understood that various modifications, changes and variation may be made in the arrangement, operation and details of construction of the elements disclosed herein without departing from the spirit and scope of this invention.

I claim:

1. A ground fault current interrupter circuit for use with a system including a power line and a neutral line in a cable having a metal sheath comprising:
   a differential transformer having a pair of opposed primary windings and a secondary winding located on the core thereof;
   circuit opening means to break the power line when a trip signal is produced in said secondary winding by an imbalance in said differential transformer resulting from a ground fault; and
   arc protection means responsive to arcing between the power line and the metal sheath to cause actuation of said circuit opening means to break the power line.

2. A ground fault current interrupter circuit as claimed in claim 1 wherein said arc protection means produces a trip signal in said secondary winding when arcing occurs between the power line and the metal sheath.

3. A ground fault current interrupter circuit as claimed in claim 2 wherein said arc protection means comprises:
   an arc protection winding located on the core of said differential transformer; and
   a resistance located in series with said arc protection winding between the metal sheath and the neutral line.

4. A ground fault current interrupter circuit as claimed in claim 3 wherein the magnitude of the arcing current at which a trip signal will be produced in said secondary winding may be adjusted by varying the number of turns of said arc protection winding and the size of said resistance.

5. A ground fault current interrupter circuit for use with a system including a power line and a neutral line in a cable having a metal sheath comprising:
   a differential transformer having a pair of opposed primary windings and a secondary winding located on the core thereof;
   circuit opening means to break the power line when a trip signal is produced in said secondary winding by an imbalance in said differential transformer resulting from a ground fault;
   an arc protection winding located on the core of said differential transformer; and
   a resistance located in series with said arc protection winding between the metal sheath and the neutral line, arcing current flow of a given magnitude through said arc protection winding creating an imbalance in said differential transformer to produce a trip signal in said secondary winding to actuate said circuit opening means to break the power line.

* * * * *